Dec. 23, 1947.　　　　F. W. ZINN　　　　2,433,185
IDENTIFICATION TAG
Filed April 18, 1944
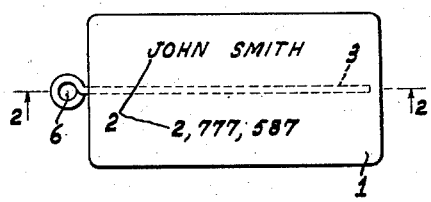
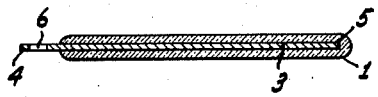
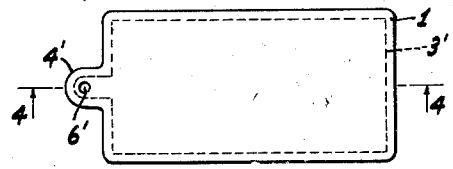
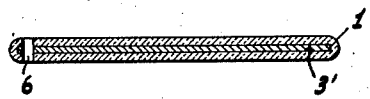
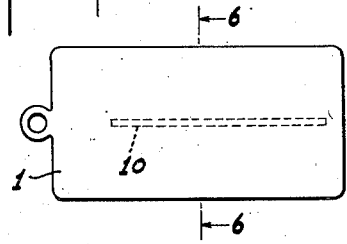
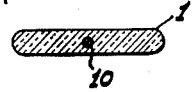
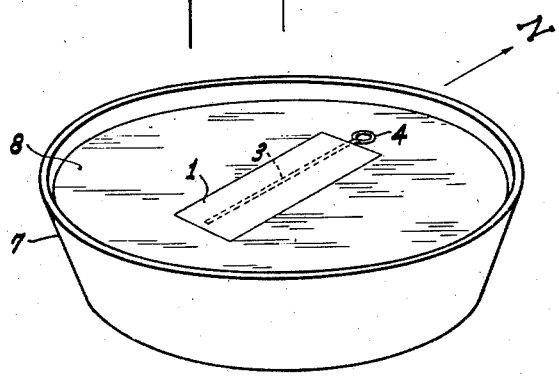
INVENTOR.
FRED W. ZINN
BY
Abraham S. Greenberg
ATTORNEY.

Patented Dec. 23, 1947

2,433,185

UNITED STATES PATENT OFFICE 2,433,185

IDENTIFICATION TAG

Fred W. Zinn, Battle Creek, Mich.

Application April 18, 1944, Serial No. 531,686

3 Claims. (Cl. 40—2.2)

This invention generally relates to identification tags, and more specifically to improved identification devices especially suitable for members of the armed forces.

One of the main objects of the present invention is to provide an identification device which includes a compass which can be readily utilized.

A further object of the present invention is to embody a compass element in an identification tag in such a way that the direction-indication function is not apparent from a casual inspection, thereby preserving secrecy. Such an identification tag could be worn by members of the armed forces, particularly members of the Air Force, so that if forced down behind enemy lines, an aviator could determine direction, day or night, without equipment other than his identification tag.

A more specific object of the invention is to provide a compass by incorporating in an identification tag, having sufficient buoyancy to float on water, a magnetized element so that the tag may be floated upon water and thereby indicate the magnetic north; the tag having visibility at night by utilizing a luminous substance for stamping of letters on the identification tag, or by making the identification tag of a luminous substance, such as a plastic.

Fig. 1 is a plan view of an identification tag embodying the invention,

Fig. 2 is a sectional view taken along line 2—2 looking in the direction of the arrows, Fig. 3 is a plan view of a modified form of tag, Fig. 4 is a sectional view taken along line 4—4 of Fig. 3 looking in the direction of the arrows, Fig. 5 is a plan view of a further modification, Fig. 6 is a sectional view taken along line 6—6 of Fig. 5 looking in the direction of the arrows, Fig. 7 is a perspective view illustrating the use of the identification tag as a compass.

Referring to the accompanying drawing, wherein similar reference characters in the different figures designate similar elements, the identification device 1 is composed of buoyant fiber or molded plastic material in the customary rectangular shape of an identification tag. The tag embodies a rod wire or strip 3 which has been magnetized to have a north pole 4 and a south pole 5. The exposed or external end of the magnetized element 3 may be provided with an eye 6 for use in securing the identification tag to the chain or cord customarily worn by members of the armed forces. The indicia 2 may provide a name, serial number, and other identification data. The indicia 2 may be provided on a face of identification tag 1 in any suitable manner as for example by stamping. Preferably, I desire the indicia 2 to be composed of luminous material so as to be visible at night. Such luminous material is well known, and may be of the phosphorescent type or fluorescent type. Such luminescent material is capable of glowing strongly at night, particularly after exposure to daylight.

The identification tag would be worn on a chain or cord around the neck of the wearer or in any suitable place, and the magnetic and luminous characteristics would not adversely affect its use as an identification tag. Utilizing it as a compass, the identification tag would be removed from the cord or chain and floated upon water in a container, or in such other way as not to be affected by winds or currents. In this way the north pole 4 would point to the magnetic north thereby serving as a compass to determine direction. In Fig. 7 I have shown the manner of using the device as a direction indicator. The pan or container 7 is filled with water 8. The tag 1 is placed thereon gently. Due to the inherent buoyancy of tag 1, the latter will float as shown. The tag will assume a final position, such that its exposed end 4 will point to the magnetic north. Of course, in the absence of a container, the tag may be placed on the surface of a quiet body of water, such as a pond, lake and the like. The material of which tag 1 is composed should have a sufficiently low specific gravity so that it will be capable of floating on the surface 8. In the case of a tag composed of a fibrous material, or of a material such as pressed cork or wood particles, the tag will have inherent buoyancy. The element 3 in general should have a high permeability, and should also have a high degree of magnetic retentivity. A material that could be used for element 3 would be a thin wire of an alloy known as "alnico." This alloy of aluminum, nickel and cobalt is well-known and readily capable of functioning as a magnetized element which will respond to the earth's magnetic field.

In using the tag it will be understood that the tag may be floated on the water by placing it on a small cork, which will act as a form of pivot. Since the exposed end 4 of the element 3 appears to be a securing eye, the fact that the tag also functions as a compass will not be revealed. Furthermore, the fact that the indicia 2 are luminous at night will facilitate use of the tag in the night-time. It is also to be understood that the phosphorescent material may be compounded in the material of which the tag 1 is composed. In the case of a plastic of the transparent type the entire body of the tag will glow at night.

In Fig. 3 I have shown a modification of the tag 1 wherein the magnetized element 3' is completely embedded within the body of the tag. The eye 6' is provided in this case at the securing end 4' of the tag. The plate 3' may be of any suitable magnetizable material, and it is preferred that a face thereof be provided with the luminous material which forms the indicia. The advantage of this modification is that the plate 3' and its data are completely protected by the body of tag 1, and thus the identification data are protected from alteration or disfigurement. The body of tag 1 should be composed of a transparent plastic such as "Lucite," or some similar material. Here again it is desired that there be incorporated with the plastic material a luminous substance so that the entire tag becomes luminous at night.

In Fig. 5 I have shown another form of tag wherein a magnetizable element 10 is completely embedded within the body of the tag. The wire or rod 10 may be composed of any suitable magnetizable material, and it will be noted from Fig. 6 that it is embedded within the body of the tag for its entire length. The tag 1 will of course be composed of a buoyant fibrous or plastic material, and the fact that the element 10 is embedded within the body of the tag will have no effect on the ability of the tag to be influenced by the earth's magnetic field.

It will be understood that various changes in the detail of construction may be made without departing from the spirit or scope of the invention as described in the following claims.

What I claim is:

1. An identification tag consisting of a thin plate of magnetized material covered with a transparent plastic, which provides buoyancy, protection of the identification tag, and greater comfort to the wearer, said plate having a portion thereof formed as a securing eye which is the north pole of the magnetized plate so that when floated on water it will indicate the magnetic north.

2. An identification tag consisting of a magnetized metal strip on which is impressed the name and other identification material, covered with a luminous buoyant plastic so as to be visible at night and said strip having an exposed end thereof concurrently functioning as a securing device and north pole responsive to the earth's magnetic field.

3. In a combination identification tag and compass device whose direction-indication function is not apparent from a casual inspection, a transparent body of substantial area to provide sufficient buoyancy to permit the tag to float on the surface of water, an elongated element having at least a major portion thereof embedded within said body, said element being sufficiently magnetized to respond to the earth's magnetic field, the remaining portion of said element having the form of a securing device, said latter portion being the north pole of the magnetized element, and said body being provided with indentification indicia.

FRED W. ZINN.

REFERENCES CITED

The following references are of record in the file of this patent:

UNITED STATES PATENTS

| Number | Name | Date |
|---|---|---|
| 713,813 | Steutermann | Nov. 18, 1902 |
| 1,071,226 | Goodsell et al. | Aug. 26, 1913 |
| 1,258,590 | Meyer | Mar. 5, 1918 |
| 1,595,801 | McDonald | Aug. 10, 1926 |
| 1,705,207 | Reynolds | Mar. 12, 1929 |
| 798,337 | Hammarlund | Aug. 29, 1905 |
| 843,330 | Drought | Feb. 5, 1907 |